PROCESS AND APPARATUS FOR SEPARATING GASES
Filed Feb. 16, 1954 2 Sheets-Sheet 1
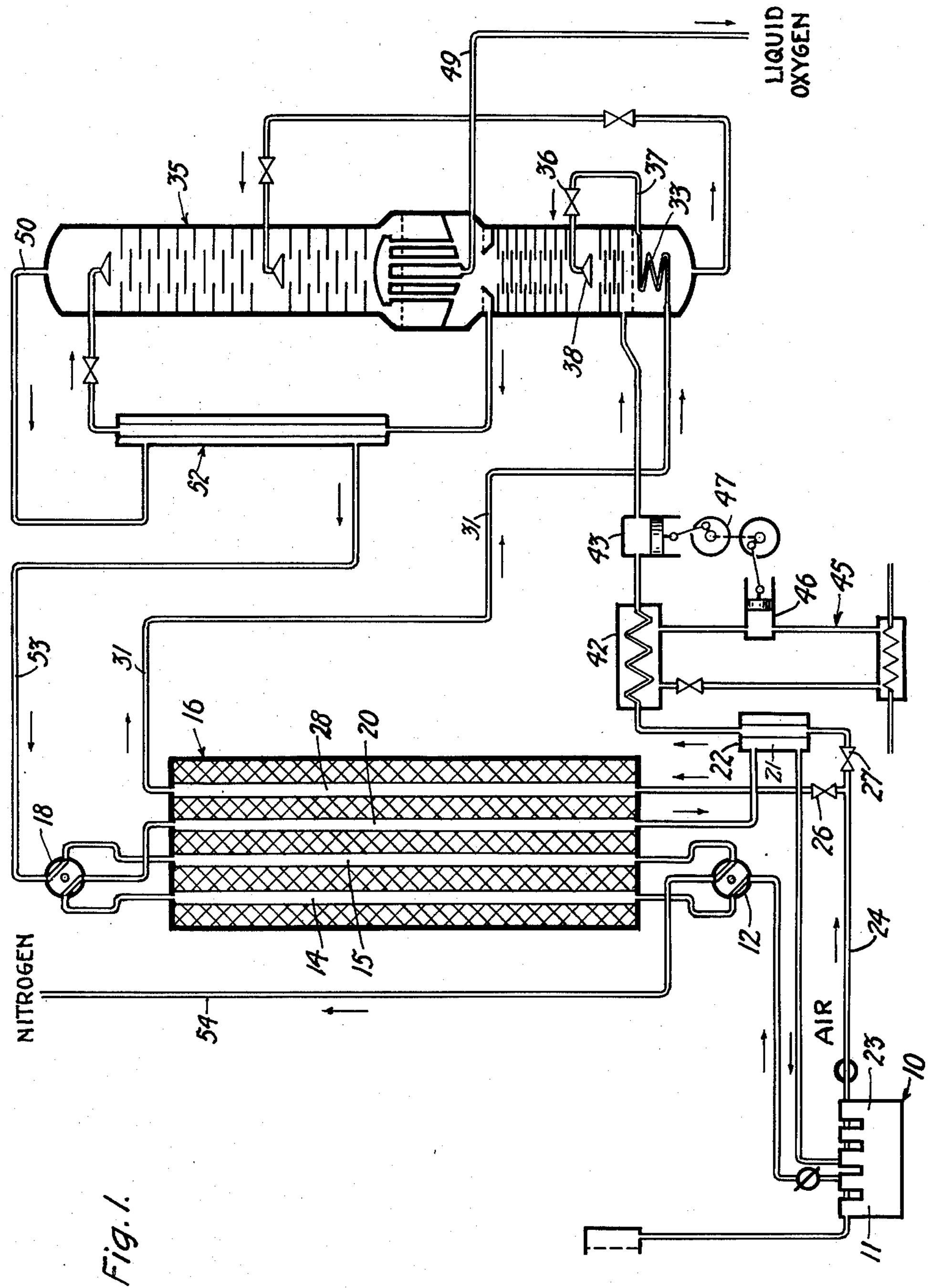
Inventor:
KENNETH TSUNODA
by Robert Irving Williams
Att'y.

PROCESS AND APPARATUS FOR SEPARATING GASES
Filed Feb. 16, 1954 2 Sheets-Sheet 2
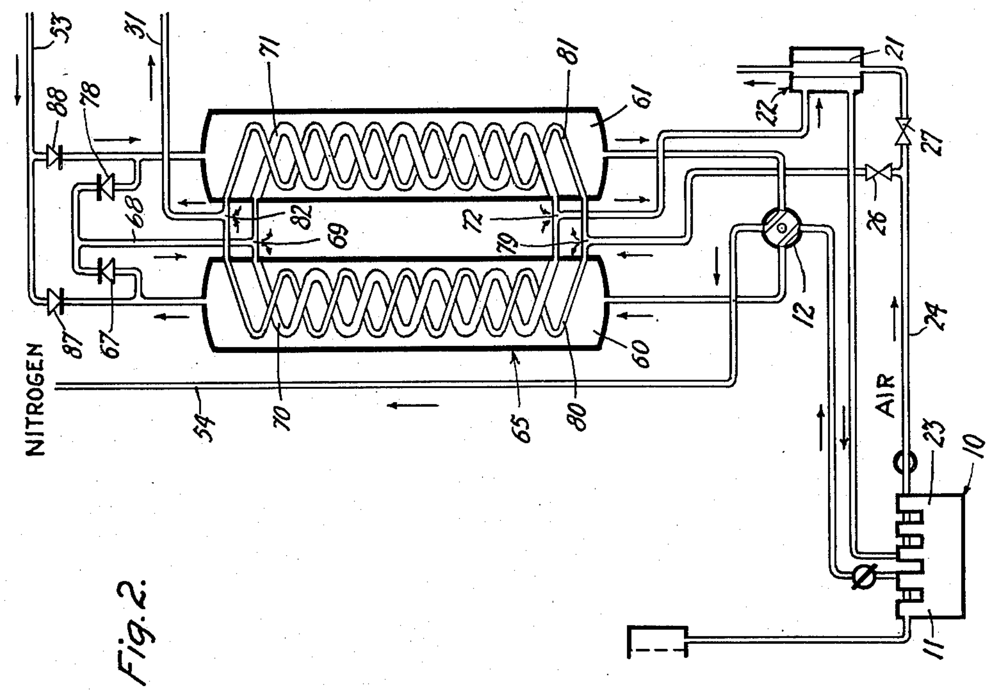
Inventor:
KENNETH TSUNODA
by Robert Irving Williams
Att'y.

United States Patent Office 2,763,138

Patented Sept. 18, 1956

2,763,138

PROCESS AND APPARATUS FOR SEPARATING GASES

Kenneth Tsunoda, New York, N. Y., assignor to American Messer Corporation, New York, N. Y., a corporation of New York Application February 16, 1954, Serial No. 410,494

10 Claims. (Cl. 62—123)

This invention relates to the separation from gaseous mixtures of one or more components thereof, to the cooling of gases, and to correlated inventions and discoveries appertaining thereto. While it finds its most ready use in the separation of various components from air and in the cooling of air and/or the components thereof, it is adapted for wide application.

Many suggestions have been made to improve the effectiveness and economy of systems for the production of oxygen, nitrogen, and/or other gases in gaseous or liquid form from air or other gaseous mixtures. In these, there are commonly employed a rectification column and a heat-exchange zone, the latter term being used herein to include so-called "heat exchangers," regenerators, and other devices wherein a plurality of gaseous streams are alined in heat-exchange relationship. In these, it is common to flow a stream of cold separated gas from the rectifier in heat-exchange relationship with the incoming air, and to reverse the flow as water, ice, and/or solid $CO_2$ are deposited in the conduit thru which the air is flowing.

With the foregoing and other considerations in view, the present invention contemplates the movement thru a heat-exchange zone of streams of air or other gaseous-exchange zone of streams of air or other gaseous mixtures at widely different pressures, and of the production of a variety of control and operating steps and apparatus whereby marked gains in effectiveness in separation and/or cooling operations and marked savings in cost may be obtained.

By the provision in the heat-exchange zone of a return stream of air or the like and/or a stream of highly compressed gas, the correlation of the temperature difference between the initial stream of air and an oppositely-flowing stream of a separation product, e. g., nitrogen, is maintained in proper and continuing balance with the tendencies of $CO_2$ and water to condense and evaporate.

Since certain changes in carrying out the above method and in the constructions set forth, which embody the invention, may be made without departing from its scope, it is intended that all matter contained in the above description or shown in the accompanying drawing shall be interpreted as illustrative and not in a limiting sense.

For a fuller understanding of the nature and objects of the invention, reference should be had to the following detailed description taken in connection with the accompanying drawings, in which:

Figure 1 is a diagrammatic showing of one manner of carrying out the invention; and Fig. 2 is a similar view of another manner.

The apparatus exemplified in Fig. 1 comprises a portion 11 of a compressor 10 which draws air from the atmosphere and compresses it to from approximately four to approximately twelve (preferably to approximately six) atmospheres, whence it is conducted to a reversing valve 12 and thence to one or the other of flow-lines 14 and 15 of a heat-exchanger 16, depending upon the setting of the valve. From whichever of the flow-lines 14 or 15 air flows, it is conducted to a valve 18 which is set (at the same time the valve 12 is set) to direct it to a return flow-line 20 in the heat-exchanger. Thence, in the present instance, it is conducted to a warming-up chamber 21 of a precooler 22 and thence to a portion 23 of the compressor 10, where it is compressed over approximately one hundred (preferably to approximately two hundred) atmospheres. It is then conducted thru conduit means 24 to valves 26 and 27. From the valve 26 a controlled portion of the highly compressed air is conducted thru a flow-line 28 in the heat-exchanger 16 and thence thru a conduit 31 to a coil 33 in a frictionation column 35, and thence thru a valve 36 by means of a conduit 37 in the column 35.

From the valve 27 a controlled portion of the highly compressed air is conducted, in the present instance, thru the precooler 22, a chiller 42, and an expansion engine 43, to the fractionation column 35. The chiller 42 is operated, in the present instance, by refrigerant circulating in a system 45 comprising a compressor 46 (which, as exemplified, is operated by the expansion engine 43 thru crank shaft 47).

Liquid oxygen is drawn from the fractionator 35 at 49 and gaseous nitrogen at 50. The latter, after passing thru a heat-transfer member 52, is conducted thru a conduit 53 to the valve 18 and thence to one or the other of flow-lines 15 and 14, depending on the adjustment of the valves, thence to the valve 12 and thence thru conduit 54 to a point where it is discharged or used.

In the form of construction exemplified in Fig. 2, the moderately compressed air from the compressor 11 is conducted to the valve 12 and thence (depending on the setting of the valve) to column 60 or column 61 of regenerator 65. From column 60 the air flows past check valve 67 and thru conduit 68 to T-connection 69 and thence thru coils 70 and 71 in columns 60 and 61 respectively. The coils join at T-connection 72, whence the air is conducted to the chamber 21 of precooler 22 as in the case of the construction shown in Fig. 1. From column 61 the air flows past check valve 78, and thence to conduit 68 where it joins the flow of air from column 60 thru the coils 70 and 71 to chamber 21.

Highly compressed air is conducted from valve 26 to T-connection 79 and thru coils 80 and 81 in columns 60 and 61 respectively. The coils join at T-connection 82, where the air enters conduit 31. Nitrogen from conduit 53 flows past one or the other of check valves 87 or 88 into whichever of columns 60 or 61 is not filled with compressed air from valve 12, and thence thru valve 12 to conduit 54.

Since certain changes in carrying out the above method and in the constructions set forth, which embody the invention, may be made without departing from its scope, it is intended that all matter contained in the above description or shown in the accompanying drawing shall be interpreted as illustrative and not in a limiting sense.

I claim:

1. The process of separating certain of the constituents thereof from a gaseous mixture containing condensable constituents which comprises moderately compressing said mixture and passing a stream of it thru one passageway in a heat-exchange zone in a given direction and passing the same stream directly thence thru a second passageway in said zone in the opposite direction, further compressing said mixture after its passage thru said passageways and passing at least part of the further-compressed mixture thru a third passageway in said zone in said given direction and thence to a separation means, passing thru a fourth passageway in said zone in said opposite direction a cold separation product from said separation means, whereby the controlled cooling action in said zone will result in controlled deposition of said condensable constituents, and periodically reversing the passage thru said one passageway and said fourth passageway so that said separation product will at times flow thru said one passageway in said opposite direction and said moderately-compressed mixture thru said fourth passageway in said given direction but will at other times flow as above recited whereby condensed constituents deposited from said moderately-compressed gas in said one passageway or in said fourth passageway will be removed by said separation product.

2. The process of separating certain of the constituents thereof from a gaseous mixture containing condensable constituents which comprises moderately compressing said mixture and passing it thru one passageway in a heat-exchange zone in a given direction and thence thru a second passageway in said zone in the opposite direction, further compressing said mixture after its passage thru said passageways and passing part of the further-compressed mixture thru a third passageway in said zone in said given direction and thence to a separation means, passing thru a fourth passageway in said zone in said opposite direction a cold separation product from said separation means, whereby the controlled cooling action in said zone will result in controlled deposition of said condensable constituents, periodically reversing the passage thru said one passageway and said fourth passageway so that said separation product will at times flow thru said one passageway in said opposite direction and said moderately-compressed mixture thru said fourth passageway in said given direction but will at other times flow as above recited whereby condensed constituents deposited from said moderately-compressed gas in said one passageway or in said fourth passageway will be removed by said separation product, and conducting another part of said further-compressed mixture to said separating means without passing thru said heat exchanger.

3. A process as set forth in claim 2 wherein the moderately-compressed mixture from said second passageway, before being further compressed, is passed in heat-transfer relationship with said other part of said further-compressed mixture.

4. A process of separating certain of the constituents thereof from air which comprises passing a stream of air at a pressure of between approximately four atmospheres and approximately twelve atmospheres thru a heat-exchange zone in one direction, further compressing said air to over one hundred atmospheres, and conducting a part thereof in a stream thru said zone in said one direction and thence to a separation means and passing another part thereof thru cooling means and to said separation means without passing thru said zone, and passing thru said zone in an opposite direction a stream of cold nitrogen from said separation means, said streams flowing thru said zone simultaneously, and said first-mentioned stream and said last-mentioned stream flowing in courses which are interchanged periodically so that the last-mentioned stream will carry off condensable constituents deposited from the first-mentioned stream.

5. A process as set forth in claim 4 wherein the air from the first-mentioned stream is passed directly thru said heat-exchange zone in said opposite direction and thereafter serves to cool said other part of the further-compressed air before being further compressed.

6. A process as set forth in claim 4 wherein the third-mentioned stream is conducted directly to said separation means.

7. A process of separating certain of the constituents thereof from air which comprises passing a stream of air at a pressure of between approximately four atmospheres and approximately twelve atmospheres thru a heat-exchange zone in one direction, further compressing said air to over one hundred atmospheres, and conducting at least a part thereof in a stream thru said zone in said one direction and thence to a separation means, passing thru said zone in an opposite direction a stream of cold nitrogen from said separation means, said streams flowing thru said zone simultaneously, and said first-mentioned stream and said last-mentioned stream flowing in courses which are interchanged periodically so that the last-mentioned stream will carry off condensable constituents deposited from the first-mentioned stream, and expanding another part of said further-compressed air and conducting it directly to said separation means.

8. Apparatus for separating certain of the constituents thereof from a gaseous mixture, comprising heat-exchange means, rectification means, means for compressing a gaseous mixture, means for leading the mixture thru said heat-exchange means first in one direction and then in the other, means for further compressing the gaseous mixture, a heat-interchange means, means for conducting the mixture from said leading means to said heat-interchange means and thence to said further compressing means, means for leading a portion of the further-compressed mixture from said further compressing means thru said heat-exchange means and thence to said rectification means, means for conducting another portion of the further-compressed mixture to said heat-interchange means and thence to said rectification means without passing thru said heat-exchange means, and means for leading a cold rectification product from said rectification means thru said heat-exchange means but not thru said heat-interchange means.

9. Apparatus as set forth in claim 8 wherein there is provided a chiller in the last-mentioned conducting means between said heat-interchange means and said rectification means.

10. Apparatus for separating certain of the constituents thereof from a gaseous mixture which comprises heat-exchange means, rectification means, means for moderately compressing a gaseous mixture, means for leading a stream of the moderately compressed mixture thru the heat-exchange means in one direction, a gas-flow conduit extending between two points in said rectification means, means for leading a stream of a separation product from the rectification means into heat-exchange relationship with said gas-flow conduit and thence directly to the heat-exchange means and thru it in the opposite direction, means for reversing the flow of said streams, means for leading the first-mentioned stream back thru the heat-exchange means in the last-mentioned direction, and means to further compress the mixture, and means to lead the further-compressed mixture thru the heat-exchange means and thence directly to said rectification means.

References Cited in the file of this patent

UNITED STATES PATENTS

| | | |
|---|---|---|
| 1,664,412 | Haynes | Apr. 3, 1928 |
| 2,504,051 | Scheibel | Apr. 11, 1950 |
| 2,667,043 | Collins | Jan. 26, 1954 |